(12) United States Patent
Stoiber et al.

(10) Patent No.: US 8,407,877 B2
(45) Date of Patent: Apr. 2, 2013

(54) DEVICE AND METHOD FOR BLOW MOLDING PLASTIC CONTAINERS

(75) Inventors: Christian Stoiber, Michelsneukirchen (DE); Thomas Philipp, Eilsbrunn (DE)

(73) Assignee: Krones AG, Neutraubling (DE)

( * ) Notice: Subject to any disclaimer, the term of this patent is extended or adjusted under 35 U.S.C. 154(b) by 273 days.

(21) Appl. No.: 12/804,800

(22) Filed: Jul. 29, 2010

(65) Prior Publication Data

US 2011/0024952 A1 Feb. 3, 2011

(30) Foreign Application Priority Data

Jul. 31, 2009 (DE) .................. 10 2009 026 298

(51) Int. Cl.
*B29C 49/64* (2006.01)
(52) U.S. Cl. ........... 29/426.1; 29/428; 249/79; 425/182; 425/526; 425/541
(58) Field of Classification Search .............. 425/182, 425/192 R, 195, 522, 526, 541; 249/79; 29/426.1, 428; 264/523
See application file for complete search history.

(56) References Cited

U.S. PATENT DOCUMENTS

| | | | | |
|---|---|---|---|---|
| RE27,469 E | * | 9/1972 | Bode, Jr. ................... | 164/416 |
| 4,702,685 A | * | 10/1987 | Fruntzek .................. | 425/182 |
| 4,786,244 A | * | 11/1988 | Holzschuh ................ | 425/192 R |
| 5,562,935 A | * | 10/1996 | Martin ..................... | 425/552 |
| 6,817,855 B2 | | 11/2004 | Unterlander et al. | |
| 7,396,225 B2 | | 7/2008 | Hansen | |
| 2010/0104681 A1 | | 4/2010 | Dagorn .................... | 425/170 |
| 2010/0252963 A1 | | 10/2010 | Scharf et al. ............. | 264/508 |

FOREIGN PATENT DOCUMENTS

| | | |
|---|---|---|
| CN | 1652919 | 8/2005 |
| CN | 1697758 | 11/2005 |
| DE | 203 18 583 U1 | 3/2005 |
| WO | WO 2008/009808 A1 | 1/2008 |

* cited by examiner

*Primary Examiner* — Robert B Davis
(74) *Attorney, Agent, or Firm* — Davidson, Davidson & Kappel, LLC

(57) ABSTRACT

A device for blow molding plastic containers includes an openable and closable blow mold for the conversion of tempered plastic preforms, whereby an inner blow pressure is applied to the plastic containers. The blow mold contains at least two shell like blow mold pieces that are arranged interchangeably at a blow mold carrier and that each contains cooling fluid pipes as conducts for a cooling fluid extending therein to temper the blow mold during and/or after blow molding of the plastic containers. The cooling fluid pipes in the blow mold are connected to a central cooling fluid supply. A coupling module that is associated with the blow mold carrier is arranged between the central cooling fluid supply and the cooling fluid pipes extending in the blow mold pieces. The coupling module and the blow mold carrier are associated spatially and/or structurally.

13 Claims, 4 Drawing Sheets

DEVICE AND METHOD FOR BLOW MOLDING PLASTIC CONTAINERS

This claims the benefit of German Patent Application DE 10 2009 026 298.9, filed Jul. 31, 2009 and hereby incorporated by reference herein.

The invention relates to a device for blow molding plastic containers. The invention further relates to a method for blow molding plastic.

BACKGROUND

During the production of plastic containers that are used to bottle drinking liquids, preforms are reshaped in blow mold or stretch blow devices using high temperatures. For blow molding suitable blow molds are used, that are made of several pieces. Usually such blow molds are made of two pieces that are able to pivot relative to each other and a base part that slides against the closed blow mold pieces. The modification of the temperature during the process of blow molding or stretch blowing is done by a cooling fluid that is guided through fluid pipes in the blow mold pieces. The at least one cooling fluid pipe can be limited to a certain area or it can extend about the entire length of the blow mold. Usually the cooling fluid pipe contains a connection that is arranged at the outside of the blow mold and that can be coupled to the cooling fluid pipe by a suitable coupling device.

If another container form is to be produced, the blow molds have to be exchanged. During this exchange the coupling devices for the cooling fluid pipes have to be detached and reattached after the new blow forms are installed. After the separation the connecting pipes are usually not in a fixed position and can move around freely. This can lead to unwanted damage or confusion of the pipes and/or their coupling devices and therefore to a malfunctioning in the cooling of the blow molds.

WO 2008/009808 A1 describes a system for the production of containers by blow molding. A blow mold contains a fluid cooling system and cooling fluid pipes with an inlet and an outlet tube that can be couplet to supply lines by a detachable coupling system. The supply lines are pooled in a modular coupling system, but are not spatially fixed after separation of the lines from the blow mold.

DE 203 18 583 U1 shows a plug-in connector for the transfer of electrical flows and fluids that are used for instance in forklifts. This pluggable fluid connection also has no spatial fixation for the detached connector.

SUMMARY OF THE INVENTION

One task of the present invention is to provide a device for blow molding containers which comprises interchangeable blow mold pieces with easily connectable and detachable fluid connectors that are protected against damage and/or wrong connector assignment at all times. Another task of the invention is to provide an improved method for exchanging blow mold pieces of a blow molding device.

Said tasks are solved by the device and method according to the present invention. The characteristics of other favourable embodiments are described in the dependent claims.

The present invention comprises a device for blow molding plastic containers, that comprises an operable and closable blow mold for the production of tempered plastic performs, whereby an inner blow pressure is applied to the plastic containers. The blow mold contains at least two shell like blow mold pieces that are arranged interchangeably at a blow mold carrier and that each contain cooling fluid pipes as conducts for a cooling fluid extending therein to temper the blow mold during and/or after blow molding of the plastic containers. The cooling fluid pipes in the blow mold are connected to a central cooling fluid supply of the blow mold device. According to the present invention a coupling module that is associated with the blow mold carrier is arranged between the central cooling fluid supply and the cooling fluid pipes extending in the blow mold pieces. The coupling module and the blow mold carrier are associated spatially and/or structurally, therefore—especially when the fluid pipes are detached or the blow mold pieces are removed—no loose pipes are present that can be clamped or damaged when the new blow molds are inserted and/or that can be connected erroneously to the new blow molds. These malfunctions can be prevented reliably because the coupling module is fixed to the blow mold carrier in a defined position.

The coupling module according to the invention can especially contain manually operable partitioning devices for the cooling fluid pipes. Preferably the coupling module is fixed tightly to the blow mold carrier and is able to produce detachable pipe connections to the respective blow mold pieces. Optionally the partitioning devices are controllable. This can for instance be done electro magnetically or by the use of other motor driven activated actuators. Therefore a remotely controlled and/or automated coupling or separation of the fluid connections is possible.

According to a preferred embodiment of the invention a separate coupling module is assigned to each single blow mold piece. A blow mold can contain at least two blow mold pieces or halves and a base part, whereby a separate coupling module is assigned to each of these three blow mold pieces.

Furthermore each of the coupling modules can contain a manually operable operating element, for instance a slide, an actuator lever, push buttons or something alike for the connection and/or disconnection of the cooling fluid pipes from the respective blow mold piece. Hereby each slide or actuator lever of each coupling module can interact with two or more parallel pipe connections. According to one embodiment of the present invention the elements for connecting and/or disconnecting the cooling fluid pipes from the respective blow mold piece can be controllable. Therefore an automated coupling or separation is possible.

The invention furthermore relates to a method for interchanging blow form pieces of an openable and closable blow mold for the production of tempered plastic preforms whereby an inner blow pressure is applied to the plastic containers, whereby the blow mold contains at least two shell like blow mold pieces that are arranged interchangeably at a blow mold carrier and that each contain cooling fluid pipes as conducts for a cooling fluid extending therein to temper the blow mold during and/or after blow molding of the plastic containers, whereby the cooling fluid pipes in the blow mold are connected to a central cooling fluid supply, characterized in that during separation of the blow mold pieces from the blow mold carrier and during the exchange of the blow mold pieces a connection that is located between the central cooling fluid supply and the cooling fluid pipes in the blow mold pieces can be attached and/or detached by an assigned coupling module.

Summarizing the description from above the invention can be characterized as follows. The invention is based on a tightly fixed coupling cassette with moving or movable elements. According to one embodiment of the present invention the cassettes for the cooling of the neck ring are located in the upper part of the mold carrier and the cassettes for the tempering of the base are located in the lower part of the base unit. The cassettes each contain two sliding elements that are spatially separated from each other and tightly attached elements. With the cassette the elements can get into a latching position and can be released with the help of an operating element, for instance a push button or something alike. A coupling element is located on one side at the ends of the elements. The coupling element can be brought in close contact with a respective counter element. The other end will be joined with the supply pipe for the cooling fluid. Furthermore the elements comprise a bolt that is disposed around an angle of 90° in respect to the shifting direction and which is used as operating element for shifting. The connections are made when the shiftable elements, which are held under mechanical tension (e.g. that are pre-tensioned by a compression spring), are brought into the latching position. Then the coolant circuit is closed. The connection is separated when the latching position is released by pushing the push button. Because of the mechanical tension of the compression spring the elements will be automatically moved into an open position and the coolant circuit will be interrupted. The operation, especially the joining and the separation of the cooling fluid pipes is realized by very short shifting distances. Therefore the operation is optimized temporally. The handling is improved considerably compared to known fluid connections. Furthermore joining of wrong supply pipes or mixing up supply pipes is almost impossible.

Further embodiments can include electrical interconnections as parts of the fluid connections. These electrical interconnections can for instance be used for the signal transduction of sensor signals. Blow mold pieces can for instance contain temperature sensors that allow an improved real-time tempering and/or temperature control because of the measured temperature signals.

BRIEF SUMMARY OF THE DRAWINGS

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged to facilitate an understanding of the invention.

DETAILED DESCRIPTION

The functionality of the device for blow molding beverage containers or plastic bottles and the method for exchanging the single blow molds is explained with the help of the schematic representations of FIGS. 1 to 4.

Figure 1:
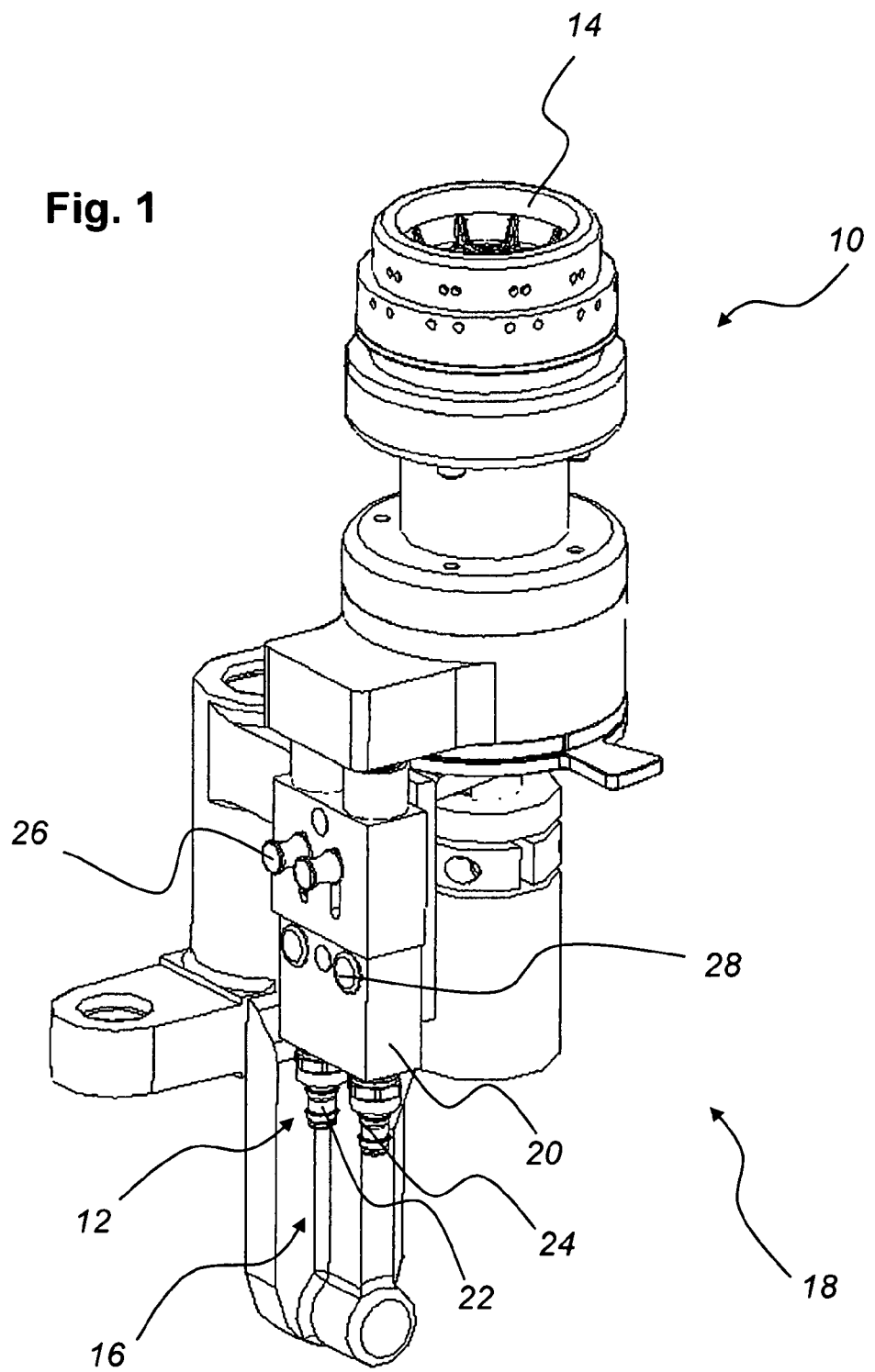
FIG. 1 shows a schematic perspective of a base part of a device for blow molding plastic containers with joined fluid connections to supply the base part with cooling fluid.
Figure 2:
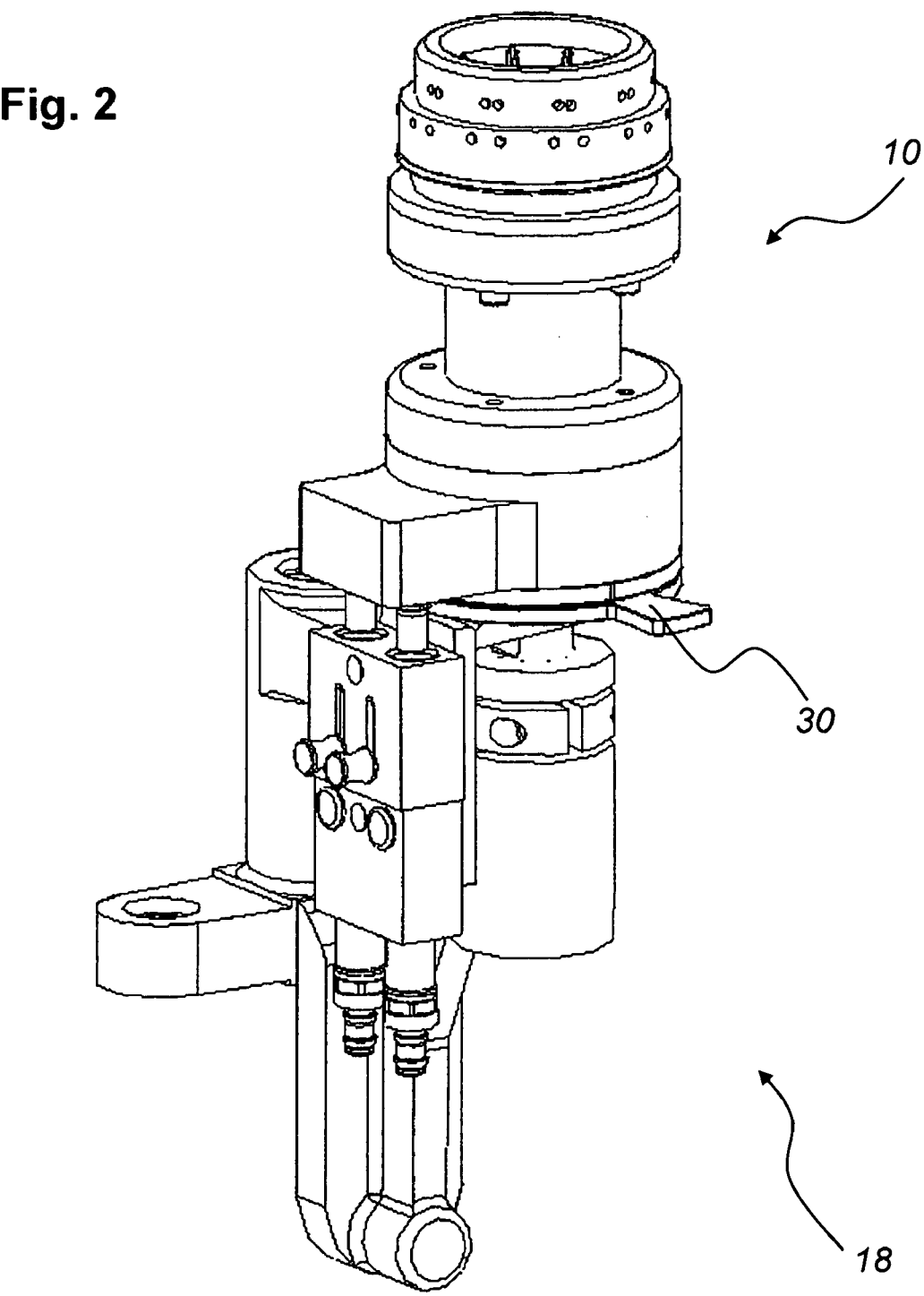
FIG. 2 shows a base part according to FIG. 1 with detached fluid connections.
Figure 3:
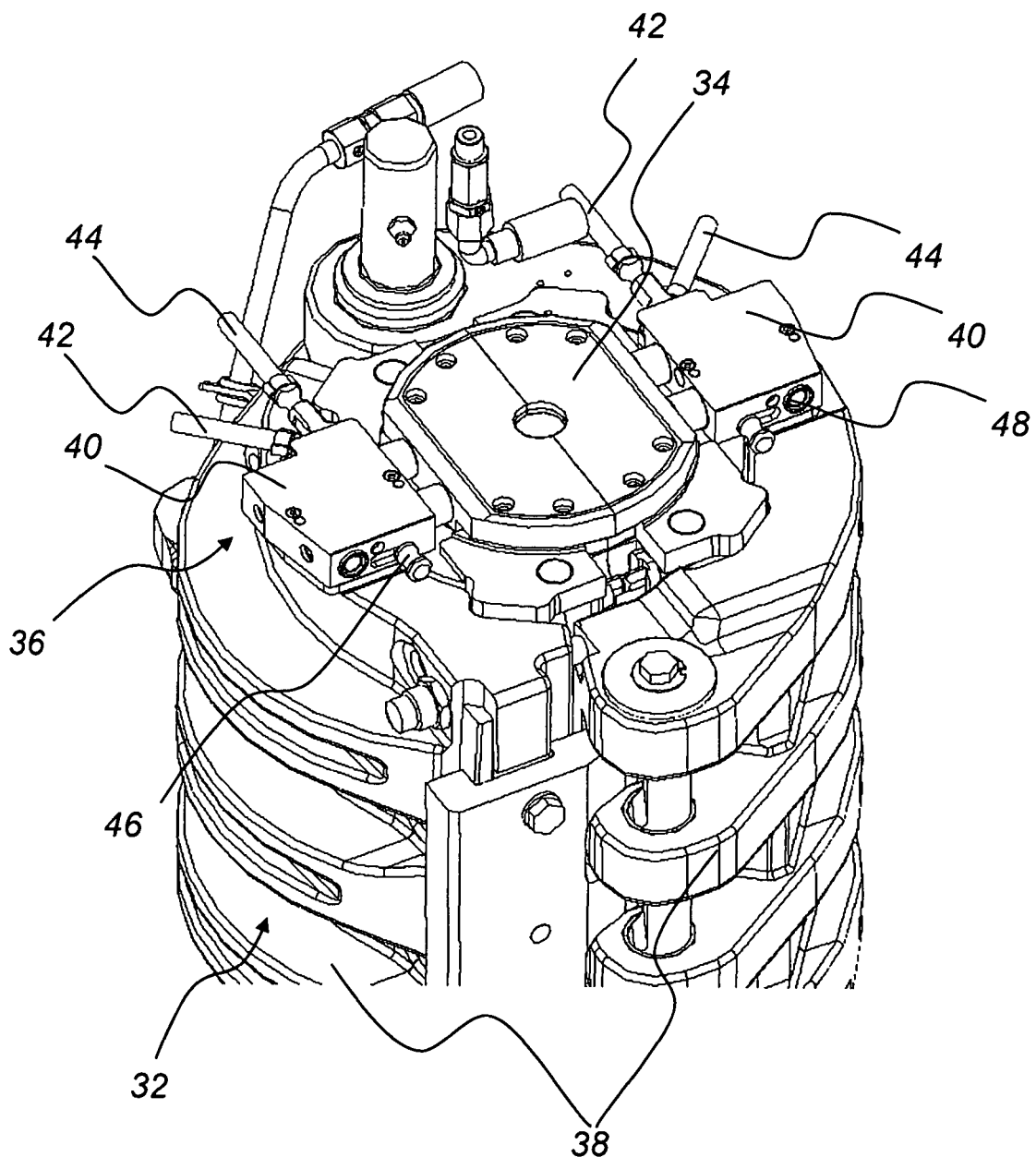
FIG. 3 shows a schematic perspective of a closed blow mold carrier with blow molds contained therein and with joined fluid connections to supply the blow molds with cooling fluid.
Figure 4:
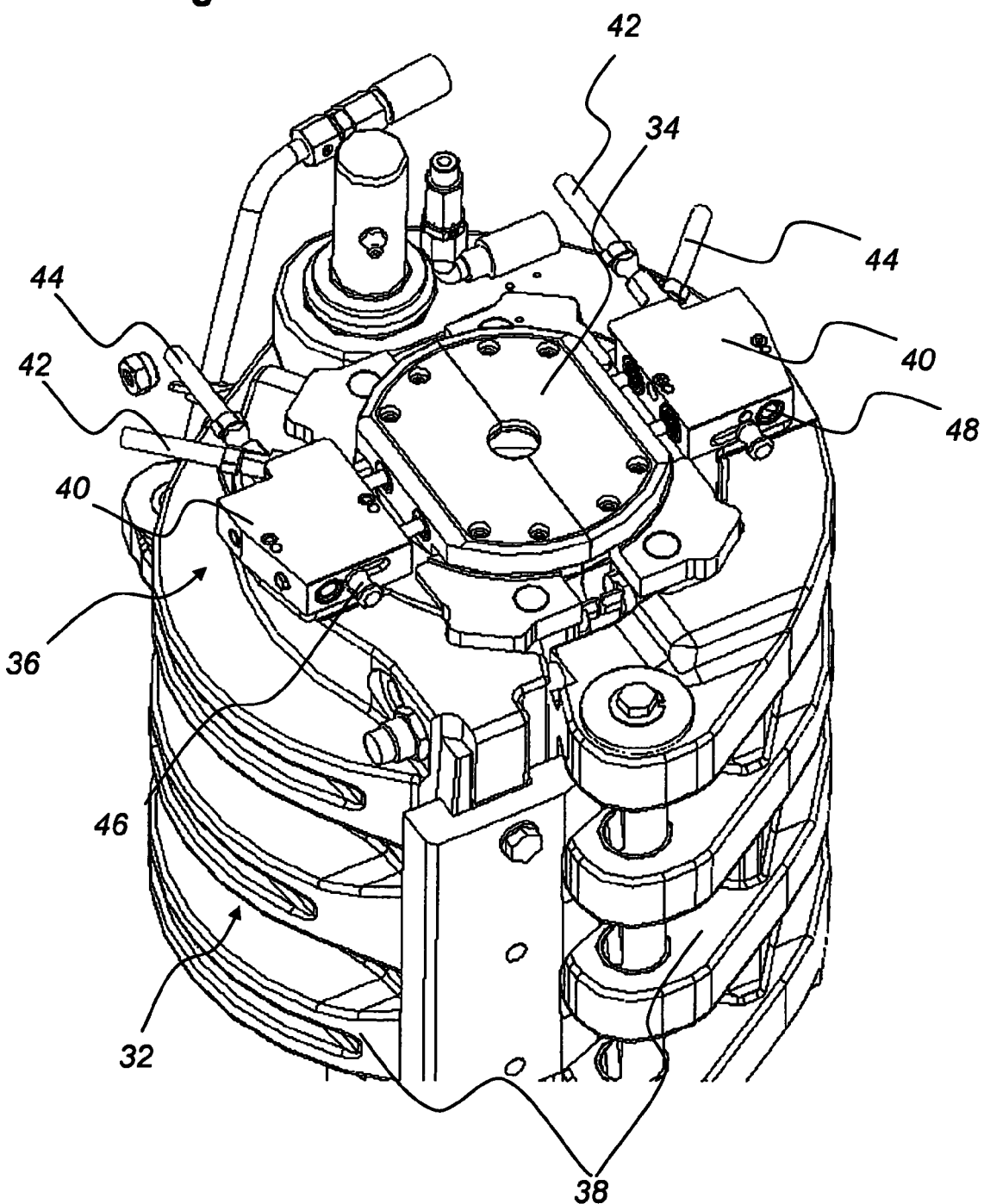
FIG. 4 shows the blow mold carrier according to FIG. 3 with detached fluid connections.

The schematic perspectives of FIGS. 1 and 2 show a base part 10 of an only partially represented device for blow molding plastic containers. FIGS. 3 and 4 show the half shells of the blow mold. The half shells are laterally openable and the bottom shape 14 of the base part 10 can be pressed to the lower front side of the half shells. Meanwhile the representation of FIG. 1 shows the situation where the fluid connections 12 are joined to the base part 14 to supply it with cooling fluid, FIG. 2 shows the situation where the fluid connections 12 are detached. The bottom shape 14 contains integrated fluid pipes (not shown), that are used for tempering the bottom shape 14 during blow molding or stretch blowing of plastic containers. The coolant fluid pipes in the bottom shape 14 are joined to a central coolant supply 16 of the blow mold device.

A coupling module 20 attached to the base part carrier 18 is located between the central coolant supply 16 and the coolant fluid pipes that are integrated in the bottom shape 14. The coupling module 20 comprises two cooling fluid pipes 22 and 24 as inlet and outlet. These can be separately blocked by a manually operable slide 26 or they can be unblocked and separated by push buttons 28 that are located beneath the slide 26 (see FIG. 2).

When the fluid connections 12 are unblocked and detached according to FIG. 2, then the whole modular base part 10 can be separated from the base part carrier 18 by rotation of the blocking/unblocking lever 30. The base part 10 can then be exchanged with another base part 10. Meanwhile the coupling module 20 and the attached fluid connections 12 remain tightly fixed to the base part carrier 18.

The schematic perspective of FIGS. 3 and 4 show a blow mold carrier 32 with blow mold pieces 34 arranged therein and with joined (FIG. 3) or detached (FIG. 4) fluid connections 36 for the supply of the blow mold pieces 34 with cooling fluid. The blow mold carrier 32 comprises two mold carrier halves 38. In the representations these mold carrier halves 38 together with the blow mold pieces 34 arranged therein are locked and are prepared for the production of the blow molded containers (not shown). A separate coupling module 40 is assigned to each blow mold piece 34. Each coupling module 40 is positioned and fastened at the respective mold carrier half 38. Each coupling module 40 contains two cooling fluid pipes 42 and 44 as fluid inlet and outlet that can be locked simultaneously with a manually operable slide 46 or that can be unblocked and separated by a push button 48 (see FIG. 4) located beside the slide 46. When the fluid connections are unblocked and separated as shown in FIG. 4, then the blow mold piece 34 constructed as modules can be taken out of the mold carrier halves 38 and exchanged by other blow mold pieces 34 as soon as the mold carrier halves 38 of the mold carrier halves 38 are opened by pivoting. The coupling module 40 and the attached fluid connections 36 stay tightly coupled to the upper side of the respective mold carrier half 38.

The invention has been described with reference to preferred embodiments. To the expert it is also conceivable, however, to make changes and modifications without leaving the scope of protection of the appended claims.

LIST OF REFERENCE NUMERALS 10 base part
12 fluid connection
14 bottom shape
16 coolant supply
18 base part carrier
20 coupling module
22 cooling fluid pipe/inlet
24 cooling fluid pipe/outlet
26 slide
28 push button
30 blocking/unblocking lever
32 blow mold carrier
34 blow mold piece
36 fluid connection 38 mold carrier half
40 coupling module
42 cooling fluid pipe/inlet
44 cooling fluid pipe/outlet
46 slide
48 push button

What is claimed is:

1. A device for blow molding plastic containers comprising:
    an openable and closable blow mold for the conversion of tempered plastic preforms whereby an inner blow pressure is applied to the plastic containers, the blow mold including at least two blow mold pieces arranged interchangeably at a blow mold carrier,
    cooling fluid pipes coupled to each blow mold piece as conducts for a cooling fluid extending therein to temper the blow mold at least one of during or after blow molding of the plastic containers,
    a central cooling fluid supply connected to the cooling fluid pipes for blow molding; and
    at least one coupling module arranged between the central cooling fluid supply and the cooling fluid pipes extending in the blow mold pieces, the coupling module and the blow mold carrier being associated at least one of spatially and structurally, the coupling module having a connection under mechanical tension to the cooling fluid pipes, the coupling module having an operating element, the connection being automatically separated via action of the mechanical tension when the operating element is activated.

2. The device according to claim 1, wherein the at least two blow mold pieces are shells.

3. The device according to claim 1, wherein the coupling module is fixed to the blow mold carrier in a defined position.

4. The device according to claim 1, wherein the coupling module is mounted tightly to the blow mold carrier.

5. The device according to claim 1, wherein the operating element is a manually-operable operating element.

6. The device according to claim 1, wherein the device includes two separate coupling modules and two blow mold pieces, the two coupling modules each being assigned to one of the two blow mold pieces.

7. The device according to claim 6, wherein the blow mold includes a base part and the device includes a third coupling module assigned to the base part.

8. The device according to claim 1, wherein the operating element is a push button.

9. The device according to claim 1, wherein the operating element interacts with two or more parallel pipe connections.

10. The device according to claim 1, wherein the operating element has two end positions for the connection and disconnection of the cooling fluid pipes.

11. The device according to claim 10, wherein the operating element interacts with two or more parallel pipe connections.

12. A method for interchanging blow form pieces of an openable and closable blow mold for the production of tempered plastic preforms by converting tempered plastic performs, the blow mold including at least two blow mold pieces which are arranged interchangeably at a blow mold carrier, each of the at least two blow mold pieces including cooling fluid pipes as conducts for a cooling fluid extending therein to temper the blow mold at least one of during or after blow molding of the plastic containers, the cooling fluid pipes in the blow mold being connected to a central cooling fluid supply of the device for blow molding, the method comprising:
    applying an inner blow pressure to the plastic containers;
    separating the at least two blow mold pieces from the blow mold carrier and exchanging the at least two blow mold pieces with at least two other blow mold pieces; and
    at least one of attaching and detaching, using an assigned coupling module, a connection between the central cooling fluid supply and the cooling fluid pipes during the separating and exchanging step, the detaching being accomplished via an operating element of the assigned coupling module that releases a mechanical tension between the coupling module and the cooling fluid pipes when actuated.

13. The method as recited in claim 12 wherein the operating element is a push button.

* * * * *